March 3, 1970 — F. A. VASSALLO — 3,498,126

APPARATUS FOR MEASURING THE ENTHALPY OF HIGH TEMPERATURE GASES

Filed March 21, 1966

INVENTOR.
FRANKLIN ALLEN VASSALLO
BY *Allen J. Jaxhe*
AGENT.

United States Patent Office 3,498,126
Patented Mar. 3, 1970

3,498,126
APPARATUS FOR MEASURING THE ENTHALPY OF HIGH TEMPERATURE GASES
Franklin Allen Vassallo, Cheektowaga, N.Y., assignor to Cornell Aeronautical Laboratory, Inc., Buffalo, N.Y., a corporation of New York
Filed Mar. 21, 1966, Ser. No. 536,156
Int. Cl. G01k 17/06
U.S. Cl. 73—190   5 Claims

ABSTRACT OF THE DISCLOSURE

A probe for measuring the enthalpy of high temperature gases having a tubular member in heat exchange relation with a gas sample flowing therethrough, the probe being sufficiently long such that substantially all of the heat energy of the sample is transferred to the member, a gaseous thermal insulator on the side of the member remote from the side thereof in contact with the sample, temperature sensors in contact with the member and sample gas flow measuring instrumentation.

---

The present invention relates to a method and apparatus for measuring the total enthalpies of gases at extremely high temperatures.

At present, the several types of enthalpy measuring or determining instruments fall into two basic categories, viz, the heat flux meter and the calorimetric probe.

The heat flux meter instruments measure the rate of heat transfer per unit areas (B.t.u./ft.$^2$/sec.) between the hot gas and the sensing instrument. Once this heat flux is known, the enthalpy of the hot gas can be determined by solving one of the complex heat transfer equations applicable to the particular geometry of the sensing instrument. At best, this method gives only an approximation of the enthalpy of the gas. This is true, because in order to solve the above mentioned heat transfer equations, the convection coefficient must be known, and since said coefficient is not generally known, a value therefor must be approximated.

The calorimetric probe has been introduced as an attempt to overcome the inaccuracies inherent in the previously mentioned heat flux meters as enthalpy measuring instruments. With the calorimetric probe, a sample of gas, the enthalpy of which is to be determined, is caused to flow in heat exchange relation with a flowing coolant. In theory, the temperature rise in the coolant is equal to the heat lost by the gas sample, and knowing the mass flow rates of the gas sample and the coolant, the enthalpy of the gas sample could easily be determined. In practice, however, the heat gained by the coolant is equal to the heat lost by the gas sample, plus the heat lost by the gas environment which is adjacent the entrance to the gas sample chamber of the probe. In an attempt to compensate for heating of the coolant by the gas environment, the calorimetric probe of the prior art made two readings of the heat content of the coolant. One, with the sample gas flowing, and the other with the sample gas stationary. The difference between these two heat values was then taken as a measure of the heat lost by the gas sample. While the enthalpy thus determined was closer to the true enthalpy of the gas than the value obtained by the heat flux meters, such enthalpy was still an approximation of the actual enthalpy of the gas. The reason why the enthalpy determined in the above manner is merely an approximation of the actual enthalpy of the gas is due to an erroneous assumption that the portion of the heat gained by the coolant from the gas environment, when the sample gas is flowing, is equal to the portion of the heat gained by the coolant from the gas environment, when the sample gas is not flowing. In fact, the heat gained by the coolant from the environment, when the sample gas is flowing varies with the particular flow rate of the gas. Thus, in order to obtain a more accurate measure of the enthalpy with the prior art calorimetric probe, it would be necessary to calibrate the probe for various flow rates each time a test is made. As is evident, probes of this type cannot have a rapid response time. In addition, the sizes of such probes are limited, since they must carry coolant structure not only to maintain the structural integrity of the device, but as a necessary part in the operation thereof.

The enthalpy probe of the present invention, although of the calorimetric type, overcomes the above mentioned difficulties of prior art probes in addition to presenting many other operational advantages which will be apparent as a discussion of the present invention proceeds.

It is another object of the present invention to provide a rapid response method of obtaining the enthalpy of a hot gas.

A further object of the present invention is to provide an accurate enthalpy measuring probe that can be smaller than presently known designs.

A still further object of the present invention is the provision of a rapid response enthalpy probe, the response time of which is orders of magnitude faster than presently known probes; making it possible to detect local instantaneous values not previously possible.

A further object of the present invention is the provision of an enthalpy probe that does not require a cooling system as a requisite to the inherent operation thereof, but only to maintain the structural integrity thereof, if desirable.

These and various objects and advantages are obtained with the present invention and will become apparent from the following description when taken in connection with the accompanying drawings.

Figure 1:
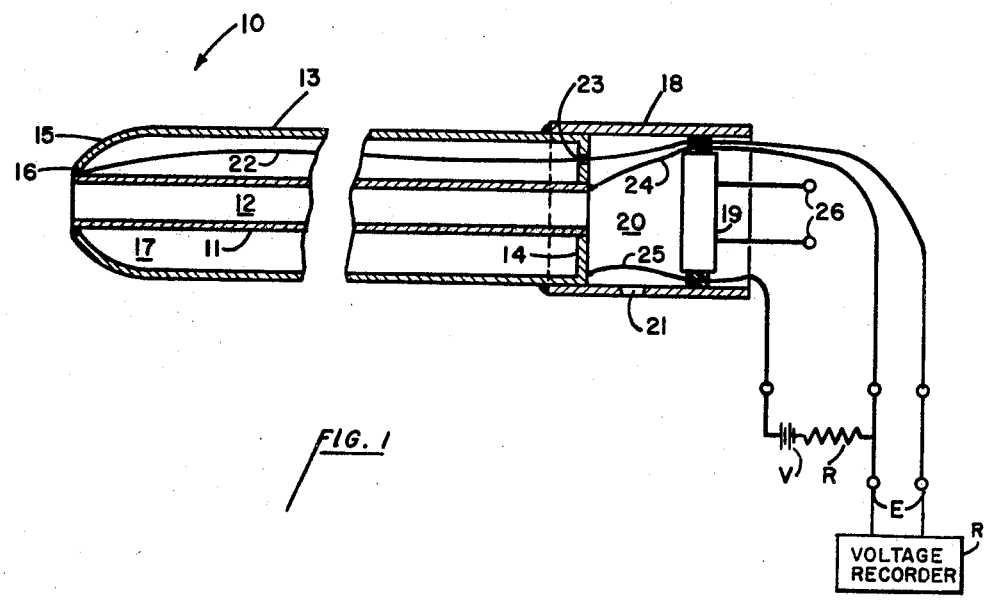
FIGURE 1 is a view of an illustrative form of the probe of the present invention in vertical section.

Referring to FIGURE 1, the probe proper, being generally indicated at 10, is shown as having an elongated steamlined profile like that of a bullet or missile. The central or sensor section of the probe comprises an elongated tubular cylinder 11 fabricated preferably of nickel, although any suitable material, as for example, copper or platinum, may be utilized. The ratio of the length of section 11 to the diameter thereof, should be greater than 50 to 1, for a purpose to be explained hereinbelow. The interior portion of section 11 defines an elongated sample passage or chamber 12. Surrounding section 11 and extending the length thereof is an outer casing 13 or stainless steel or the like, having a flat end wall 14 and a curved front wall 15. The outer casing 13 is suitably attached to sensor section 11, as by silver solder 16 or the like, and defines therewith an annular air space chamber 17.

Attached to outer casing 13 and extending rearwardly from the end wall thereof is a hollow cylindrical end casing 18. A transducer element 19, which may typically be a piezoelectric crystal is attached to said end casing by means of a suitable sealing and insulating material as, for example, epoxy cement. Transducer 19 closes off the rear end of casing 18 and defines with end wall 14 a plenum chamber 20 communicating with sample passage 12. A sonic orifice 21 is provided in end casing 18 intermediate wall 14 and transducer 19. Sonic orifice 21 is adapted to be connected to a source of vacuum (not shown).

Attached to the joint at 16 between sensor section 11 and casing 13 is an insulated nickel wire 22 which extends through an opening 23 in end wall 14. Insulated wires 24 and 25 are connected, respectively, with the end of sensor section 11 and end wall 14. The wires 22, 24, and 25 pass through the epoxy cement joint which attaches transducer 19 to end casing 18.

Before discussing the actual operation of the enthalpy probe of the present invention, it is desirable at this point, to discuss its theory of operation. The energy equation in terms of the heat lost by a gas sample in passage 12 taken at the start of passage 12 and at the end thereof, designated as points 1 and 2 is:

(1) $$Q_g = (h_1 - h_2) M_g$$

where $Q_g$ is the heat loss in B.t.u./sec.
$h_1$ is the total entering enthalpy of a gas sample in B.t.u./lb.
$h_2$ is the total exit enthalpy of a gas sample
$M_g$ is the mass rate of flow of a gas sample in lb./sec.

The heat energy absorbed by sensor section 11 is given by (2) $$Q_s = \frac{\partial}{\partial \tau} \int_0^L \rho C_p \, At \, dx$$

where $Q_s$ is the heat gain in B.t.u./sec.
$\rho$ is the density of sensor in lb./ft.$^3$
$C_p$ is the specific heat of sensor in B.t.u./lb./° F.
$A$ is the cross sectional area of sensor in ft.$^2$
$dx$ is the elemental length of sensor in ft.
$L$ is the length of sensor in ft.
$t$ is the temperature of sensor in ° F.
$\tau$ is the time in sec.

It has been found that air space 17 provides sufficient insulation that the heat lost by sensor 11 is made negligible. Therefore, an energy balance between heat lost by sample and heat gained in sensor by combining (1) and (2) gives:

(3) $$h_1 - h_2 = \rho \frac{C_p A L}{M_g} \frac{\partial}{\partial \tau} \frac{1}{L} \int_0^L t \, dx$$

but (4) $$\frac{1}{L} \int_0^L t \, dx = t_{avg.}$$

and (5) $$\rho A L = M_s$$

where $t_{avg.}$ is the average temperature in length L of the sensor
$M_s$ is the mass of the sensor Combining (3), (4), and (5), the charge in enthalpy of the gas sample is (6) $$h_1 - h_2 = \frac{M_s}{M_g} C_p \frac{dt_{avg.}}{d\tau}$$

If the gas sample in passage 12 is cooled down almost to room temperature at exit conditions, its enthalpy value can be neglected when compared to the very high enthalpy at entry conditions. This occurs when the length of the probe is sufficiently great when compared with the diameter; in the ratio of 50 to 1, for example. Thus, (7) $$h_1 = \frac{M_s}{M_g} C_p \frac{dt_{avg.}}{d\tau}$$

The manner in which the unknowns $dt_{avg.}/d\tau$ and $M_g$ are determined by the present enthalpy probe will now be discussed.

In operation, the probe of FIGURE 1 is adapted to be inserted and removed rapidly from a stream of hot gas. Actually, the probe must remain in the gas stream long enough for steady state flow conditions to be established in sample passage 12, this being necessary in order for the above equations to be valid. The vacuum at orifice 21 sucks the sample gas through passage 12 such that Mach 1 is established at the throat of orifice 21. The time involved is on the order of 0.0005 sec. when the sensor length is about 1.5 to 2 inches, and its outer diameter and thickness are .022 and .003 inch, respectively. As the walls of sensor 11 gain heat, its electrical resistivity changes. In fact, the change in resistance is proportional to the average temperature ($\alpha t_{avg.}$) change in the sensor. Thus a knowledge of the change in resistance of the sensor with respect to time gives an indication of ($\alpha t_{avg.}/\alpha \tau$), one of the unknown quantities of Equation 7. When a voltage input V in series with a relatively high resistance R with respect to the resistance of the sensor is placed across wires 24 and 25, the change in resistance of the sensor is measured by determining the change in voltage E across wires 22 and 24. Inasmuch as the current in the circuit can be treated as a constant, the voltage E is proportional to the resistivity of sensor 11, and thus the temperature thereof. Any conventional continuous voltage recorder or the like can be placed between wires 23 and 24, as shown schematically at R in FIGURE 1. Such a recorder would function as is known to indicate the change in voltage E with respect to time and therefore the change in resistivity of sensor 11 with respect to time.

The mass rate of flow of the gas sample is determined by sensing the electrical output of transducer 19 at terminal 26 which output is a function of the pressure in plenum chamber 20 acting thereagainst. With sonic flow existing at 21, the mass rate of flow of the sample gas is a direct function of the pressure in chamber 21 and an inverse function of the square root of the absolute temperature thereat. Since the absolute temperature in degrees Rankine is equal to the exit temperature in degrees Fahrenheit plus 460, merely an estimate of the exit temperature will suffice. For example, an error of 50° out of 100° F. will produce an error of only about 4 percent in the entering enthalpy. It is to be understood that in the interest of being more precise than necessary, a temperature sensor could be placed at the exit of passage 12. This will not only permit the exact weight of flow to be determined but the exact exit enthalpy as well.

As is apparent, the rate of flow signal at 26 can be combined with the change in temperature signal at R and applied to suitable indicating apparatus (not shown) to give a direct reading of the enthalpy of the high temperature gas. As an alternative or addition thereto, such signals may be utilized for control purposes.

The rapid response time of the probe makes it extremely useful in measuring high instantaneous gas enthalpy valves. In addition, the enthalpy profile of a gas stream may be determined simply by having the probe traverse the stream and reading at known points along the traversal the changes in voltage at E and 26. If the probe traverses the stream with constant velocity, the reading can be correlated to the distances along the stream by simply obtaining the product of velocity and time. If the probe does not have constant velocity, then any suitable arrangement may be utilized to so correlate readings and distances.

Typically, a probe of the material and dimensions noted supra can remain or "reside" in a hot gas stream for about 0.020 second before destruction thereof. And since as also mentioned earlier, the response time of such a probe is about 0.0005 second, there is sufficient time for the probe to traverse a stream taking many readings along the path of travel. In fact, with a one-inch diameter stream it has been calculated that the probe would not have to move any faster than four feet per second.

The probe of FIGURE 1 can be made sufficiently small in size to measure the enthalpy of small streams without interfering with the flow pattern.

Figure 2:
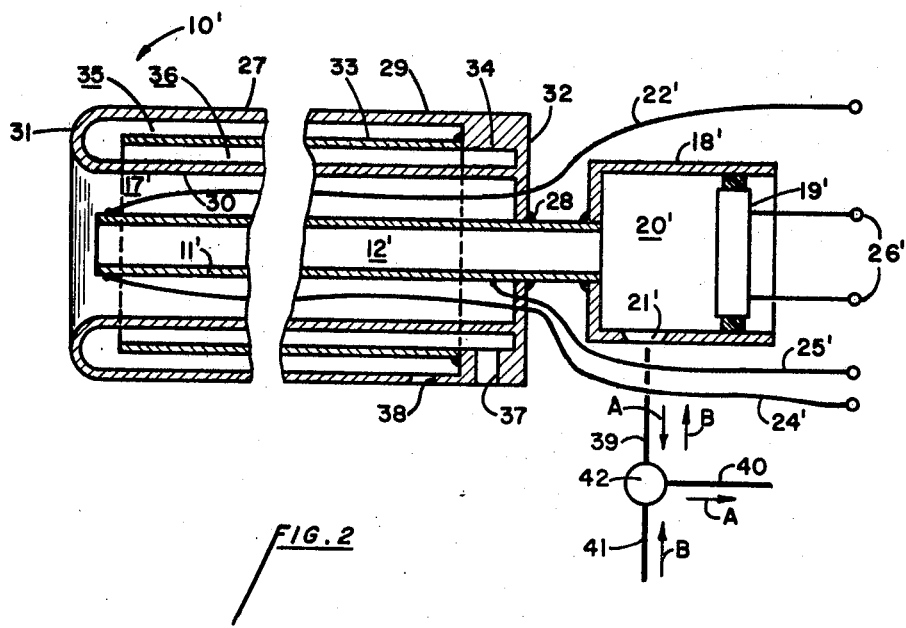
FIGURE 2 is a sectional view of a modified probe of the present invention.

In FIGURE 2 is shown a modification of the probe of FIGURE 1 wherein permanent installation in the hot gas environment is contemplated. The parts in FIGURE 2 that are similar to corresponding parts in FIGURE 1 are represented by the same numeral and primed. As shown in FIGURE 2, the sensor element 11' is surrounded by a coolant unit 27 which is suitably attached thereto at 28. Unit 27 comprises cylindrical outer and inner annular walls 29 and 30, respectively, joined by a curved annular front wall 31 and a flat end wall 32. A cylindrical tubular baffle 33 is suitably attached to a stepped portion 34 of the flat end wall 32, dividing the interior of unit 27 into outer and inner annular chambers 35 and 36, respectively. As can be seen in FIGURE 2 baffle 33 does not mean curved wall 31 thereby providing a passage permitting fluid communication between chambers 35 and 36. A coolant water inlet passage or port 37 is provided through stepped portion 34 of wall 32, said passage communicating with inner chamber 36. A coolant water outlet port 38 is provided in outer wall 29 affording fluid communication with outer chamber 35. Ports 37 and 38 are adapted to communicate respectively with coolant water supply and return lines (not shown). Inner wall 30 is suitably spaced from sensor 11' to provide an insulating air space 17' therebetween.

The structure for determining the mass rate of flow of the sample and the wiring arrangement is the same as in FIGURE 1, thus no further description thereof is necessary. It is to be noted, however, that sonic orifice port 21' communicates alternately with a source of vacuum (not shown) and a source of cool gas (not shown) by means of conduits 39, 40, and 39, 41, respectively. A three-way cock 42 or the like may be provided to perform the switching function.

In operation of the probe of FIGURE 2 cooling water is continuously caused to flow from the supply, (not shown) through port 37, inner chamber 36, outer chamber 35, and through port 38 to the return (not shown). In this manner the sensor 11' is continuously protected against the extremely high gas temperatures. When a test is desired, orifice 21' is connected to a source of vacuum through valve 42 and line 40, initiating sample gas flow in the direction of arrows A through passage 12' of sensor 11'. Readings indicative of the rate of change of sensor temperature and the pressure in plenum chamber 20' are taken in the manner previously described with regard to the FIGURE 1 embodiment. After the test, valve 42 is switched communicating passage 39 with a source of cool gas, air, for example. This cool gas, flowing in the direction of arrows B passing through the sample chamber emerging at the entrance thereof, effectively blocks the heat flow at the sensor tip and, in addition cools the sensor tube to a low temperature. As is apparent valve 42 or the like could be suitably controlled by an appropriate timing system for periodic or cyclic enthalpy readings.

Although the embodiments of FIGURES 1 and 2 illustrate and describe a preferred manner of applying the principles of the present invention to achieve the stated objects, it is to be understood that other arrangements will occur to those skilled in the art. For example, instead of using sensor tubes 11 and 11' as resistance thermometers to obtain the average temperature increase, a plurality of thermocouples could be suitably placed along the length thereof. Also, any equivalent means for obtaining the rate of flow of the sample gas may be utilized. Thus, the embodiments shown should be taken as illustrative of the present invention; the scope of which is to be limited only by the appended claims.

What is claimed is:

1. Apparatus for enabling the enthalpy of a high temperature gas to be determined, comprising;
   (1) an elongated tubular heat responsive sensor defining a passage therethrough and fabricated of a material having a high thermal conductivity,
   (2) means causing a sample quantity of said gas to flow through said sensor passage in heat exchange relation therewith,
   (3) gaseous means thermally insulating said sensor from the environment whereby the heat lost by said sample quantity of gas is equal to the heat gained by said sensor, and
   (4) means for measuring the average temperature increase with time of said sensor as said sample gas flows therethrough, said means including means for developing electrical signals in response to changes in the electrical resistivity of said sensor as said sample gas flows therethrough.

2. Apparatus according to claim 1 wherein said sensor passage is sufficiently long with respect to the diameter thereof to reduce the enthalpy of the gas leaving said sensor to a negligible fraction of the enthalpy of the gas entering the sensor.

3. Apparatus according to claim 1 further comprising;
   (5) a plenum chamber communicating with the downstream portion of said sensor,
   (6) a sonic orifice in a wall of said plenum chamber, and,
   (7) means for measuring the pressure in said plenum chamber.

4. Apparatus according to claim 1 further comprising a cooling unit in surrounding spaced relation to said sensor adapted to contain a continuous flow of coolant fluid, and means for flowing an amount of cool gas through the sensor passage after each test.

5. Apparatus for enabling the enthalpy of a high temperature gas to be determined, comprising;
   (1) a heat responsive sensor made of a solid material having a high thermal conductivity,
   (2) means causing a sample of said high temperature gas to flow in heat exchange relationship with said sensor,
   (3) means permitting substantially the total heat content of said sample gas to be extracted from said gas and absorbed by said sensor, said means including a gaseous medium for thermally insulating said sensor from the environment,
   (4) means for measuring the average temperature increase with time of said sensor as said gas is flowing in heat exchange relationship therewith, said means including means for developing electrical signals in response to changes in the electrical resistivity of said sensor as said sample gas flows therethrough, and
   (5) means for measuring the mass rate of flow of said sample gas.

References Cited

UNITED STATES PATENTS

| | | | |
|---|---|---|---|
| 3,095,739 | 7/1963 | Doolittle | 73—190 |
| 3,138,025 | 6/1964 | Fingerson | 73—339 |
| 3,167,956 | 3/1963 | Grey | 73—190 |
| 3,204,447 | 9/1965 | Krause et al. | 73—15 |
| 3,233,458 | 2/1966 | Vrolyk | 73—190 |
| 3,296,865 | 1/1967 | Blackshear et al. | 73—359 |
| 3,301,059 | 1/1967 | Haas | 73—339 |

JAMES J. GILL, Primary Examiner

H. GOLDSTEIN, Assistant Examiner